US010394308B2

(12) United States Patent
Zhu et al.

(10) Patent No.: US 10,394,308 B2
(45) Date of Patent: Aug. 27, 2019

(54) ELECTRICAL DEVICE AND A POWER SAVING METHOD THEREOF

(71) Applicants: Inventec Appliances (Pudong) Corporation, Shanghai (CN); Inventec Appliances Corp., New Taipei (TW)

(72) Inventors: Jing-Wei Zhu, Shanghai (CN); Shi-Song Chen, Shanghai (CN)

(73) Assignees: INVENTEC APPLIANCES (PUDONG) CORPORATION, Shanghai (CN); INVENTEC APPLIANCES CORP., New Taipei (TW)

( * ) Notice: Subject to any disclaimer, the term of this patent is extended or adjusted under 35 U.S.C. 154(b) by 0 days.

(21) Appl. No.: 14/933,662

(22) Filed: Nov. 5, 2015

(65) Prior Publication Data

US 2016/0187964 A1 Jun. 30, 2016

(30) Foreign Application Priority Data

Dec. 26, 2014 (CN) .......................... 2014 1 0855411

(51) Int. Cl.
*G06F 1/32* (2019.01)
*G06F 1/3287* (2019.01)
*G06F 1/3203* (2019.01)

(52) U.S. Cl.
CPC .......... *G06F 1/3287* (2013.01); *G06F 1/3203* (2013.01); *Y02D 10/171* (2018.01); *Y02D 50/20* (2018.01)

(58) Field of Classification Search
CPC .................................................... G06F 1/3296
See application file for complete search history.

(56) References Cited

U.S. PATENT DOCUMENTS

| | | | | |
|---|---|---|---|---|
| 6,271,605 B1 * | 8/2001 | Carkner | H02J 7/0031 | 307/125 |
| 6,342,738 B1 * | 1/2002 | Lutnaes | H04M 1/0214 | 307/125 |
| 2003/0201672 A1 * | 10/2003 | Stranberg | H02J 9/06 | 307/66 |
| 2004/0056533 A1 * | 3/2004 | Chen | H02J 9/005 | 307/25 |
| 2006/0100002 A1 * | 5/2006 | Luebke | G06F 3/0362 | 455/574 |
| 2008/0265976 A1 * | 10/2008 | Ko | H03K 17/284 | 327/398 |
| 2009/0040672 A1 * | 2/2009 | Chishima | H02J 9/005 | 361/63 |
| 2011/0106330 A1 * | 5/2011 | Lickfelt | B60L 1/00 | 700/297 |
| 2011/0302437 A1 * | 12/2011 | Haddab | H02H 7/18 | 713/323 |

(Continued)

*Primary Examiner* — Volvick Derose
(74) *Attorney, Agent, or Firm* — Foster Pepper PLLC

(57) ABSTRACT

The present invention provides an electrical device having a power saving mode, a sleep mode, and a run mode of an OS system. A modality switch controls an on-off of the battery module and the OS system for achieving to switch between the power saving mode and other modes. The power saving method mentioned above can apply to the shipment and the storage of the electrical device to reduce the power consumption of the battery.

11 Claims, 3 Drawing Sheets

Battery module 10
Switch module 20
Modality switch 201
Power saving module 30
Electric switch 301
Second voltage pull element 302
Inverter 303
First voltage pull element 304
OS system 40

(56) References Cited

U.S. PATENT DOCUMENTS

| | | | | |
|---|---|---|---|---|
| 2012/0054522 | A1* | 3/2012 | Huang | H01M 10/48 713/323 |
| 2013/0124892 | A1* | 5/2013 | Lu | G06F 1/30 713/322 |
| 2013/0246817 | A1* | 9/2013 | Yang | G06F 1/3212 713/320 |
| 2013/0255335 | A1* | 10/2013 | Jonely | E05B 47/0001 70/277 |
| 2013/0258387 | A1* | 10/2013 | Hashimoto | G06K 15/4045 358/1.14 |
| 2014/0068310 | A1* | 3/2014 | Sultenfuss | G06F 1/28 713/340 |
| 2014/0191590 | A1* | 7/2014 | Yanagidaira | H02J 7/0063 307/130 |
| 2015/0106638 | A1* | 4/2015 | Sun | G06F 1/3296 713/323 |
| 2015/0333377 | A1* | 11/2015 | Davila | H01M 10/425 429/50 |
| 2015/0349509 | A1* | 12/2015 | Hingorani | H02H 1/06 361/56 |

* cited by examiner

ELECTRICAL DEVICE AND A POWER SAVING METHOD THEREOF

PRIORITY CLAIM

This application claims the benefit of the filing date of China Patent Application No. 201410855411.9 filed on Dec. 26, 2014. The foregoing application is hereby incorporated by reference in its entirety as if fully set forth herein.

FIELD OF THE INVENTION

The present invention relates to an electrical device, and more particularly, to an electrical device saving its power during its shipment and a power saving method thereof.

DESCRIPTION OF THE PRIOR ART

The voltage of a battery module disposed in an electrical product may become extra-low when the battery module over-discharges during long-term shipping and being in standby. This could cause the battery to be unable to be recharged. Accordingly, after arriving at the destination, when a user uses the electrical product for the first time, the electrical product may be unable to start up.

Nowadays, a finished electrical device before long-term shipment is usually arranged to be put into a sleep mode and placed into a package box. Then, the electrical device is shipped to a user under the sleep mode, of which the journey could last for more than one month by sea/land.

The electrical current consumption of the electrical device is an important indicator for the electrical device. Even under sleep modes, the electrical current consumption of the electrical device could be about 400 μA, which is not insignificant. When considering a large volume of electrical devices being transported, although the power saving amount may be small for an individual electrical device, the total power saving amount becomes significant.

SUMMARY OF THE INVENTION

According to an aspect of the present invention, there is provided an electrical device comprising an OS system, a battery module, a switch module and a power saving module, which can apply to the shipment and the storage of the electrical device to reduce a power consumption of its battery. The power saving module is electrically coupled to the battery module and the OS system. The switch module controls the power saving module to connect or disconnect the battery module with the OS system.

Selectively, the switch module comprises a modality switch for controlling the electrical device to be switched to different powering modes.

Selectively, the power saving module comprises an electrical switch, for connecting or disconnecting the battery module and the OS system.

Selectively, the power saving module further comprises a first voltage pull element, a second voltage pull element and an inverter.

Selectively, the first voltage pull element is electrically connected to the battery module, and the inverter is electrically connected to the electrical switch via the second voltage pull element.

Selectively, the modality switch is configured to control the electrical device to switch the OS system operating mode to a power saving mode, a sleep mode, or a run mode.

Selectively, the modality switch comprises a switch button.

Selectively, the electrical device is a mobile device.

According to another aspect of the present invention, there is provided a power saving method comprising the following steps of: controlling a battery module electrical connection to an OS system using a switch module and a power saving module; determining if there is an electrical conduction pathway connection between the battery module and the OS system; turning off a power saving mode if there is an electrical conduction pathway connection; and turning on the power saving mode if there is not an electrical conduction pathway connection.

Aspects of the present invention provides the electrical device with a power saving mode, a sleep mode and a run mode; and connecting or disconnecting its battery module and OS system through a modality switch capable of switching to the different powering modes. The power saving method of the present invention may be applied to the shipment and the storage of the electrical device, and reduce power consumption of the battery.

BRIEF DESCRIPTION OF THE DRAWINGS

Example embodiments of the present invention will now be described in detail, with reference to the following figures, wherein like designations denote like members, wherein.

DETAILED DESCRIPTION OF THE PREFERRED EMBODIMENT

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of embodiments of the present invention.

Figure 1:
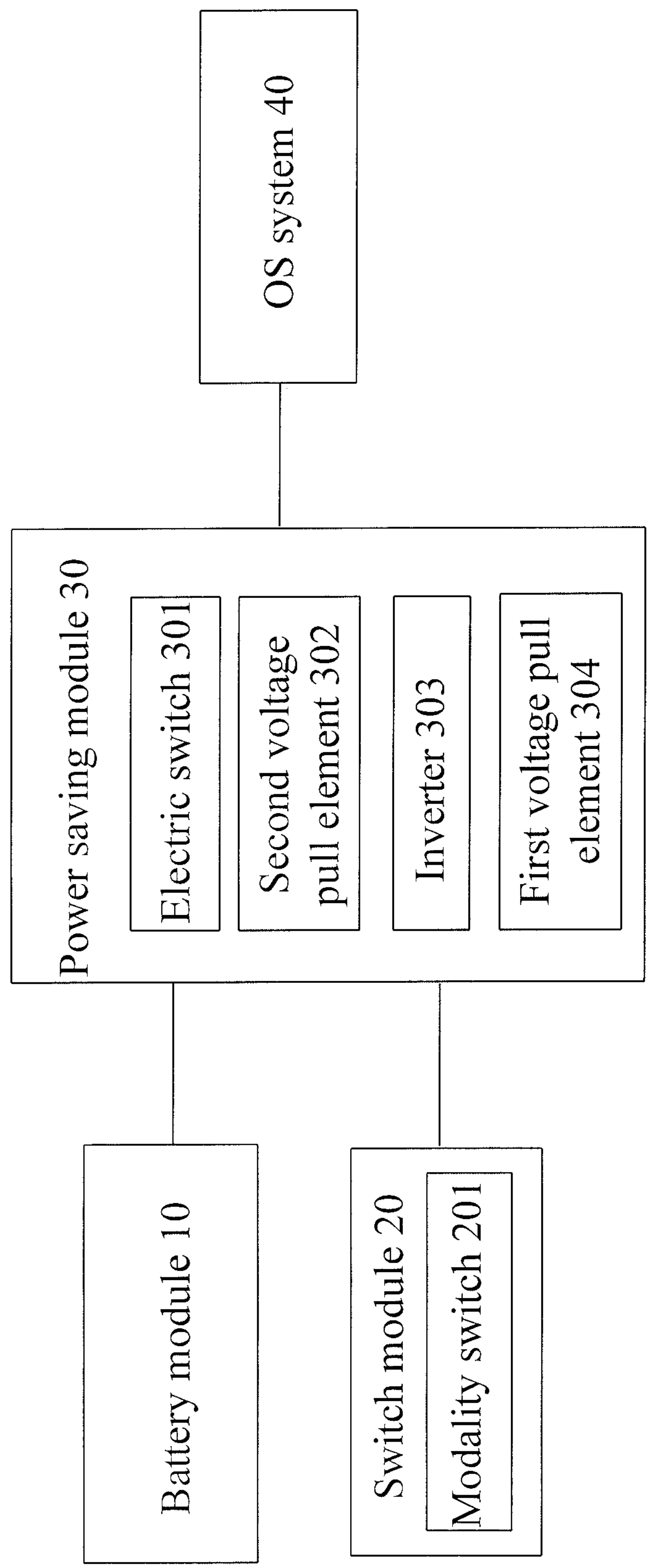
FIG. 1 shows a diagram of an electrical device according to an embodiment of the present invention.

FIG. 1 shows an electrical device comprising a battery module 10, an OS system 40, a switch module 20 and a power saving module 30. The power saving module 30 is electrically coupled to the battery module 10 and the OS system 40. The switch module 20 controls the power saving module 30 to connect or disconnect the battery module 10 with the OS system 40.

The switch module 20 comprises a modality switch 201 for controlling the electrical device to be switched to different powering modes. The power saving module 30 comprises an electrical switch 301, a first voltage pull element 304, a second voltage pull element 302 and an inverter 303. The first voltage pull element 304 is electrically connected to the battery module 10. The inverter 303 is electrically connected to the electrical switch 301 via the second voltage pull element 302. The electrical switch 301 is configured to connect or disconnect the battery module with the OS system The electrical device of the present invention is a mobile terminal, for example a PC, a mobile phone or a tablet PC.

Figure 2:
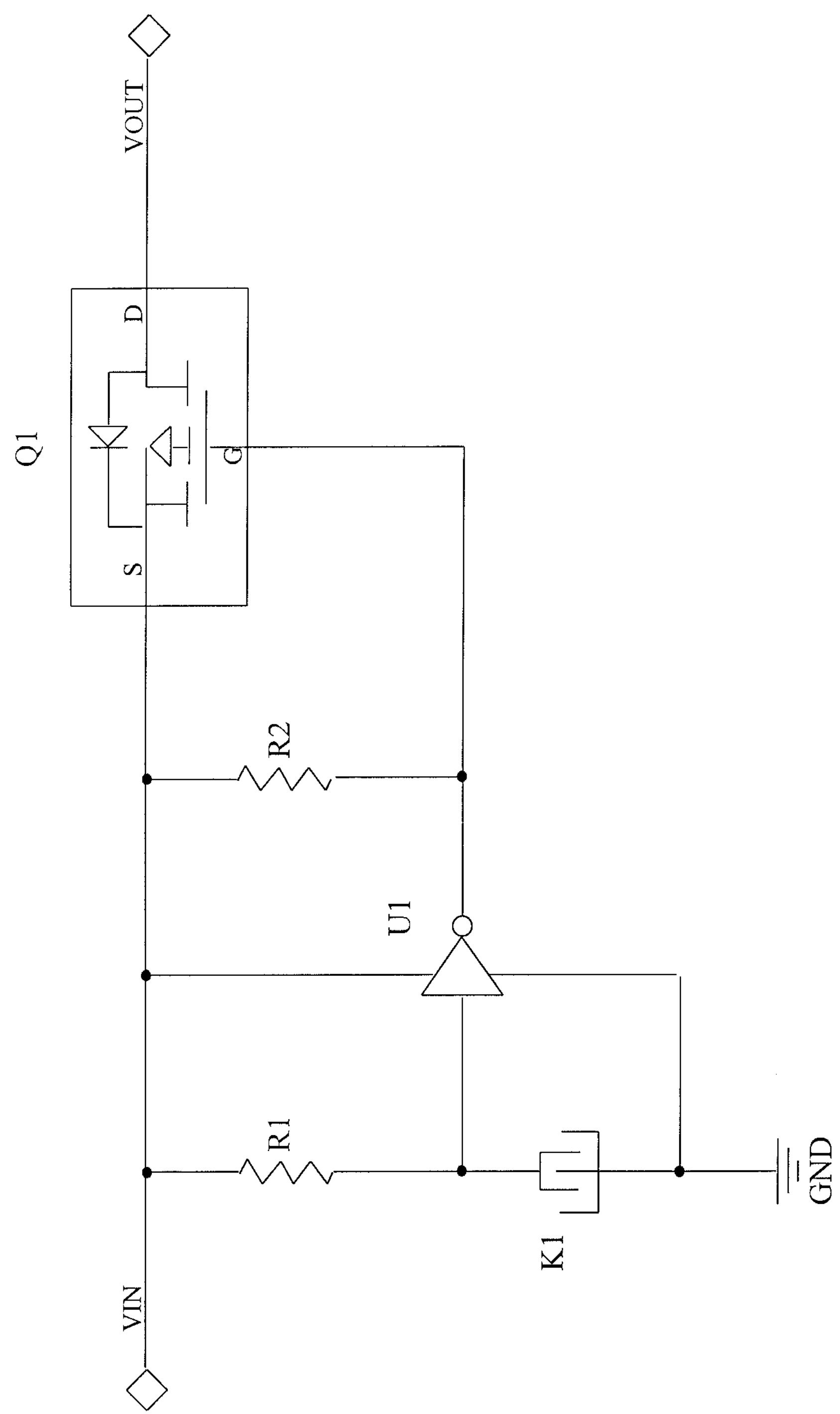
FIG. 2 shows the equivalent-circuit diagram of the switch module shown in FIG. 1.

Referring to FIG. 2, under an initial situation, the modality switch 201 (K1 in FIG. 2) is turned on, the input terminal of the inverter 303 (U1 in FIG. 2) is pulled up to a high voltage level by the first voltage pull element 304 (R1 in FIG. 2) and outputs a low voltage level (inverted) to enable the electrical switch 301 (Q1 in FIG. 2) to make the battery module 10 connects to the OS system 40 through the electrical switch 301. The OS system 40 is thus able to work when the battery module 10 supplies the power.

If the modality switch 201 is turned off, the input terminal of the inverter 303 (U1 in FIG. 2) is pulled down to a low voltage level by the modality switch 201 and outputs a high voltage level (inverted). The second voltage pull element 302 (R2 in FIG. 2) is pulled up to a battery voltage to disable the electrical switch 301, and the power pathway between the battery module 10 and the OS system 40 is cut off. This makes the electrical device go into a power saving mode.

If the modality switch 201 is turned on again, the battery module 10 again connects to the OS system 40 through the electrical switch 301 to operate the OS system 40.

Figure 3:
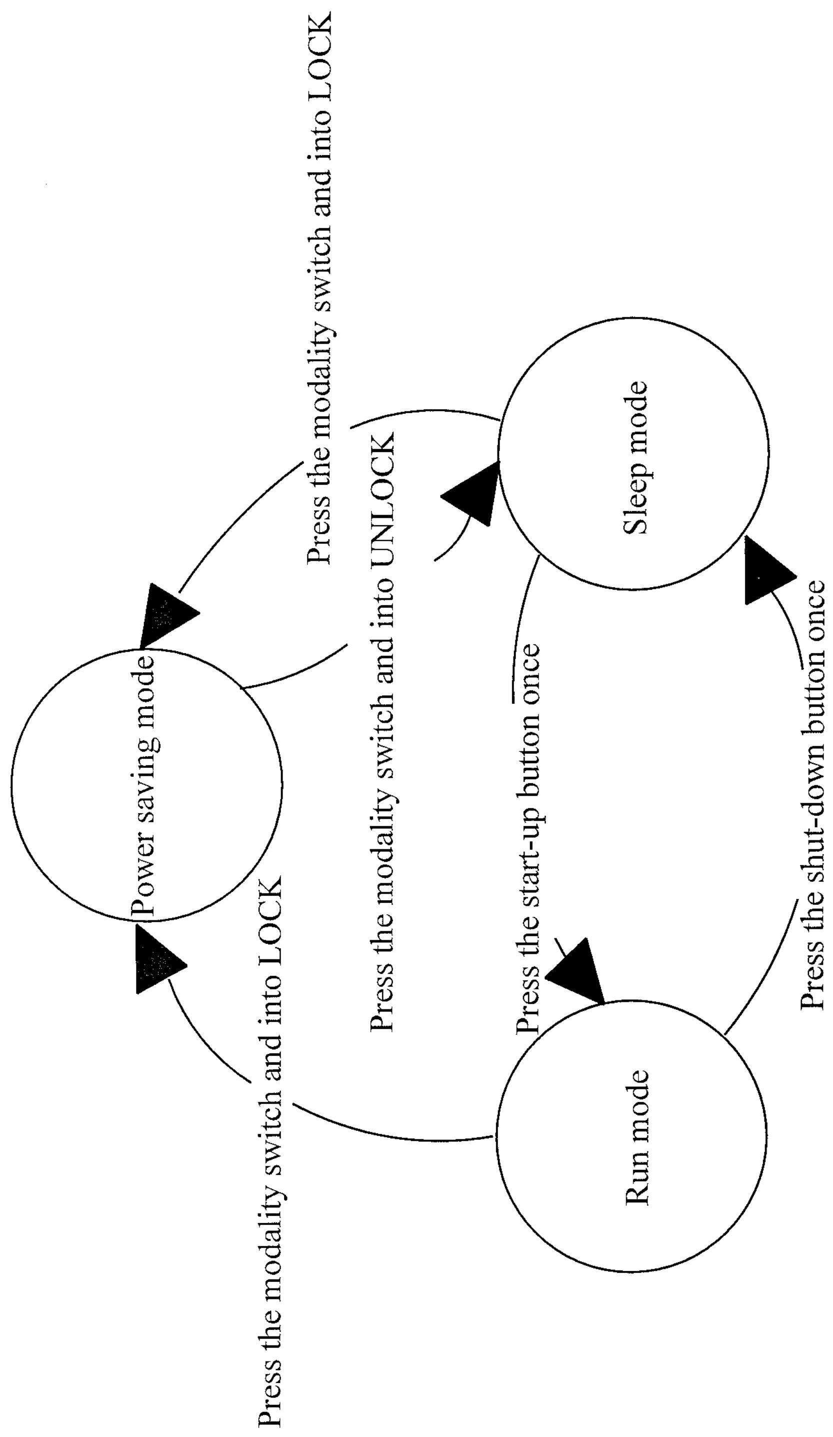
FIG. 3 shows the diagram of a power saving method according to an embodiment of the present invention.

Referring to FIG. 3, the electrical device of the present invention comprises a power saving mode, a sleep mode and a run mode. The modality switch 201 controls the electrical device switching between the power saving mode and other modes through the switches in series.

The sleep mode is turned to the run mode when the start-up button is pressed under the initial situation to start up. From the run mode, if the shut-down button is pressed, the run mode is turned to the sleep mode. When the modality switch 201 is pressed under the run mode to make the electrical device go into the power saving mode, the electrical switch 301 is turned off. That is, the battery module 10 and the OS system are turned off. Afterwards, from the power saving mode, the electrical device can go into the sleep mode when the modality switch 201 is pressed and set into a LOCK condition. From the sleep mode, the electrical device can go back to the power saving mode when the modality switch 201 is pressed and set into an UNLOCK condition.

The power saving mode can be utilized for the shipment and storage of the electrical device, which supports a reduction of power consumption of the battery.

The present invention further provides a power saving method comprising the switch module for controlling the power saving module to connect or disconnect the battery module with the OS system. This enables control of the electrical device to be switched from different modes to the power saving mode.

In an embodiment, the present invention further provides a power saving method for an electrical device, the electrical device comprising an OS system, a battery module, a power saving module coupled to the OS system and the battery module, and a switch module coupled to the power saving module. The switch module is configured to control the power saving module to connect or disconnect the battery module with the OS system and control the electrical device switching to/from the power saving mode.

The electrical device of the present invention comprises the power saving mode, the sleep mode and the run mode. The modality switch controls the electrical device to be switched to different powering modes. The power saving method can be applied to the shipment and storage of the electrical device to reduce power consumption of the battery.

The present invention is not limited to the embodiment described herein, and those skilled in the art will readily observe that various modifications and alterations of the device may be made in accordance with the teachings of the present invention. Accordingly, the present disclosure should be construed as limited only by the metes and bounds of the appended claims.

The embodiments of the invention in which an exclusive property or privilege is claimed are defined as follows:

What is claimed is:

1. An electrical device, comprising:
- an OS system module;
- a battery module;
- a power saving module coupled to the OS system module and the battery module, comprising:
  - an electrical switch, for controlling the battery module to or not to supply power for the OS system module to work;
  - a first voltage pull element, electrically connected to the battery module;
  - a second voltage pull element; and
  - an inverter, electrically connected to the electrical switch; and
- a switch module for controlling the power saving module to make the power saving module control the battery module to or not to supply power for the OS system module to work, comprising a modality switch for controlling the electrical device to be switched to different powering modes;
- wherein under an initial situation, turning off a power saving mode by actuating the modality switch to an open position to drive the electrical switch open, then using the inverter and the first voltage pull element to enable an electrical conduction pathway connection for the battery module to supply power for the OS system module to work for making the electrical device under a run mode;
- then, turning on the power saving mode by actuating the modality switch to a close position to drive the electrical switch close, then using the inverter and the second voltage pull element to disable an electrical conduction pathway connection to cut off the power supply from the battery module to the OS system module to disable the OS system module;
- and when the modality switch is pressed under the power saving mode and set into a LOCK condition, the electrical device is under a sleep mode.

2. The electrical device of claim 1, wherein the inverter is electrically connected to the electrical switch via the second voltage pull element.

3. The electrical device of claim 1, wherein the modality switch comprises a switch button.

4. The electrical device of claim 1, wherein the electrical device is a mobile device.

5. A power saving method for an electrical device comprising the following steps of:
- controlling a battery module to or not to supply power for an OS system module to work using a switch module and a power saving module;
- determining if there is an electrical conduction pathway connection from the battery module to supply power for the OS system module to work;
- turning off a power saving mode if there is an electrical conduction pathway connection; and turning on the power saving mode if there is not an electrical conduction pathway connection;

wherein the power saving module further comprises: an electrical switch, for controlling the battery module to or not to supply power for the OS system module to work; a first voltage pull element, electrically connected to the battery module; a second voltage pull element; and an inverter, electrically connected to the electrical switch; the switch module further comprises a modality switch for controlling the electrical device to be switched to different powering modes;

wherein under an initial situation, turning off the power saving mode by actuating the modality switch to an open position to drive the electrical switch open, then using the inverter and the first voltage pull element to enable an electrical conduction pathway connection for the battery module to supply power for the OS system module to work for making the electrical device under a run mode;

then, turning on the power saving mode by actuating the modality switch to a close position to drive the electrical switch close, then using the inverter and the second voltage pull element to disable an electrical conduction pathway connection to cut off the power supply from the battery module to the OS system module to disable the OS system module;

and when the modality switch is pressed under the power saving mode and set into a LOCK condition, the electrical device is under a sleep mode.

6. A power saving method for an electrical device, the electrical device comprising an OS system module, a battery module, a power saving module coupled to the OS system module and the battery module, and a switch module coupled to the power saving module, the power saving method comprising the following steps of:

controlling a battery module to or not to supply power for the OS system module to work using the switch module and the power saving module; and determining if there is an electrical conduction pathway connection from the battery module to supply power for the OS system module to work;

turning off a power saving mode if there is an electrical conduction pathway connection; and turning on the power saving mode if there is not an electrical conduction pathway connection;

wherein the power saving module further comprises: an electrical switch, for controlling the battery module to or not to supply power for the OS system module to work; a first voltage pull element, electrically connected to the battery module; a second voltage pull element; and an inverter, electrically connected to the electrical switch; the switch module further comprises a modality switch for controlling the electrical device to be switched to different powering modes;

wherein under an initial situation, turning off the power saving mode by actuating the modality switch to an open position to drive the electrical switch open, then using the inverter and the first voltage pull element to enable an electrical conduction pathway connection for the battery module to supply power for the OS system module to work for making the electrical device under a run mode;

then, turning on the power saving mode by actuating the modality switch to a close position to drive the electrical switch close, then using the inverter and the second voltage pull element to disable an electrical conduction pathway connection to cut off the power supply from the battery module to the OS system module to disable the OS system module;

and when the modality switch is pressed under the power saving mode and set into a LOCK condition, the electrical device is under a sleep mode.

7. The power saving method of claim 6, wherein the modality switch is disposed in the switch module; and the inverter, the first voltage pull element, the second voltage pull element and the electrical switch are disposed in the power saving module.

8. The power saving method of claim 7, wherein the modality switch controls the electrical device and switches the electrical device to different powering modes.

9. The power saving method of claim 8, wherein the modality switch comprises a switch button.

10. The power saving method of claim 6, wherein the inverter is electrically connected to the electrical switch via the second voltage pull element.

11. The power saving method of claim 6, wherein the electrical device is a mobile device.

* * * * *